Patented July 25, 1939

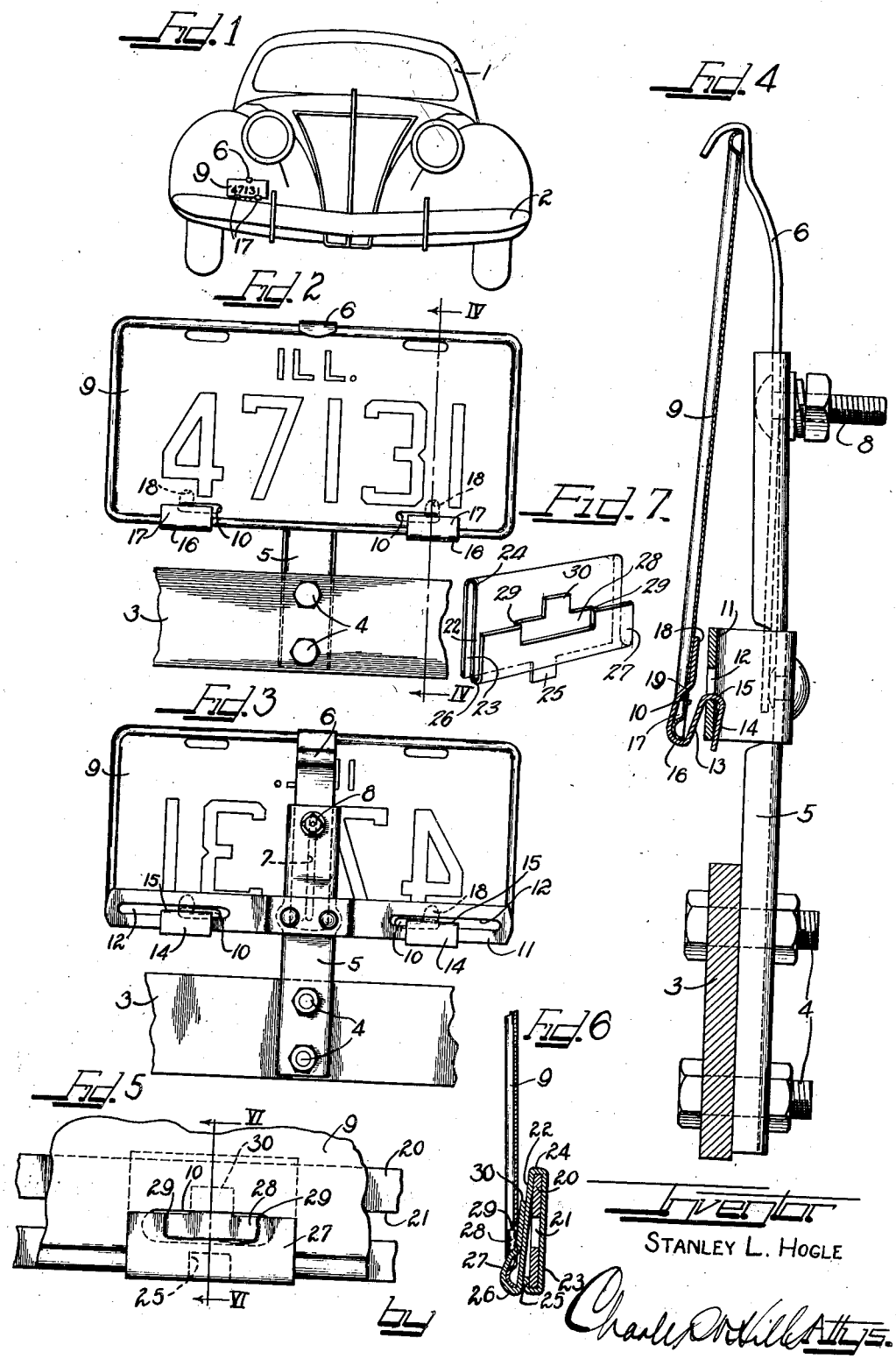

2,166,994

UNITED STATES PATENT OFFICE 2,166,994

LICENSE PLATE HOLDER

Stanley L. Hogle, Aurora, Ill., assignor to Aurora Equipment Company, Aurora, Ill., a corporation of Illinois Application July 21, 1938, Serial No. 220,433

3 Claims. (Cl. 40—125)

The present invention relates to automobile license plate holders and more particularly to improved license plate supporting clips for engagement with the lower or upper slotted margin of a license plate and for engagement with the slotted cross member of a license plate holding device forming part of the standard equipment of an automobile.

It is an object of this invention to provide improved license plate supporting clips, in place of supporting bolts, for effectively supporting a license plate on a license plate holder bracket forming part of an automobile.

It is also an object of this invention to provide license plate supporting clips adapted to be readily engaged with a license plate and with a license plate supporting bracket by merely engaging portions of the clips through the registering slots of the license plate and the license plate supporting bracket.

It is also an object of this invention to provide a license plate supporting clip constructed of metal bent into an S-shaped form and having one or more extension fingers to facilitate convenient mounting of the license plate on a supporting bracket.

It is an important object of this invention to provide improved and simplified forms of license plate supporting clips, which obviate the use of the ordinary securing bolts, and which are adapted to be easily associated with the lower slotted margin of a license plate and with the slotted portion of a license plate supporting bracket to permit the license plate to be quickly and securely mounted in position on the license plate supporting bracket.

Other and further important objects of this invention will be apparent from the disclosures in the specification and the accompanying drawing.

The invention (in preferred forms) is illustrated in the drawing and hereinafter more fully described.

On the drawing:

Figure 1 is a front elevation of an automobile having a license plate mounted in position by means of improved license plate holders or clips embodying the principles of this invention.

Figure 2 is an enlarged front elevation of a license plate and the supporting bracket therefor and showing license plate clips engaged with the lower portion of the license plate for supporting the same in position.

Figure 3 is a rear elevation of the license plate and supporting bracket shown in Figure 2 and showing the rear view of the supporting clips.

Figure 4 is an enlarged vertical detailed sectional view taken on line IV—IV of Figure 2 and illustrating in detail a cross section of one of the license plate supporting clips.

Figure 5 is a fragmentary elevational view of a portion of a license plate and a license plate supporting bracket with the license plate supported in position by a modified form of license plate holder or clip for use on a license plate supporting bracket which is not equipped with the adjustable clamping hook such as illustrated in Figure 4.

Figure 6 is a transverse detail section taken on line VI—VI of Figure 5.

Figure 7 is an isometric view of the clip, shown in Figures 5 and 6 in original form.

As shown on the drawing:

Referring to Figures 1 to 4 inclusive, the reference numeral 1 indicates an automobile equipped with a front bumper 2 supported in position by means of bumper supporting brackets 3. Rigidly secured to the bumper brackets 3 by means of bolts 4 is the lower apertured end of a channel upright 5 forming part of a standard license plate supporting bracket. Slidably engaged in the upper end of the channel upright 5 is a license plate clamping hook 6 provided with a slot 7 (Figure 3) through which a clamping bolt 8 projects for rigidly clamping the slidable hook 6 in a set position of adjustment as shown in Figure 4.

The license plate 9 is provided with the usual slots 10 for the reception of the ordinary supporting bolts which are used for holding the license plate secured to the slotted cross bar or arm 11 which is rigidly secured transversely of the channel member 5 of the license plate bracket. The transverse arm 11 of the bracket is provided with the slots 12.

The present invention relates more particularly to supports for the lower or upper margin of the license plate 9, said supports replacing the ordinary types of washers and bolts heretofore commonly in use. The improved license plate supporting devices are in the form of holders or clips each of which is constructed out of sheet metal or wire forms, a strip or section of which is bent upon itself to form an S cross sectioned body portion comprising an intermediate plate 13, a side plate 14 which is integrally connected with the intermediate plate 13 by a bight portion 15. Also integrally connected with an opposite margin of the intermediate plate 13 by a bight portion 16 is another side plate 17. Integrally formed on the upper marginal edge of the side plate 17 is a lug or finger piece 18 which is deflected at 19 to conveniently permit the finger piece 18 to be projected through one of the slots 10 in the lower margin of the license plate 9 as clearly illustrated in Figure 4.

To mount the license plate 9 on the cross arm 11 of a license plate supporting bracket forming part of an automobile, it is only necessary to take two of the holders or clips and engage the plate portions 14 through the openings 12 of the cross arm 11 to hook the clips on the cross arm as clearly illustrated in Figure 4. The lower margin of the license plate 9 is now engaged in the upwardly directed hook portions of the clips behind the front plates 17 with the lugs or fingers 18 projecting through the lower slots 10 of the license plate thereby positioning the lugs or fingers against the back face of the license plate. With the lower portion of the license plate supported in the clips, the upper margin of the license plate is pushed backwardly toward the bracket hook 6 which is slidably moved downwardly so that the upper hook end thereof will engage over the upper margin of the license plate to hold the same clamped in the supporting clips. The nut on the bolt 8 is now rigidly secured in place to hold the clamping hook 6 in a rigid set position of adjustment to securely hold the license plate in its proper position on the automobile.

Figures 5 and 6 illustrate a modified form of license plate supporting clip or holder for use on a different type of license plate supporting bracket, such for example as one without the top clamping hook 6. The license plate supporting bracket illustrated in Figures 5 and 6 merely comprises a cross arm 20 provided with the usual longitudinal slots 21. The arm 20 is adapted to be supported by any suitable upright support which is adapted to be secured to the bumper supporting bracket 3 or to any other suitable part of the automobile on which the license plate is to be mounted. The modified form of holder or clip is constructed out of sheet metal which is bent to provide an intermediate plate 22, a back plate 23 which is integrally connected with the plate 22 by a bight portion 24. Integrally formed on the lower margin of the plate portion 23 is a lug or finger piece 25. Integrally formed on the intermediate plate 22, along the lower margin thereof, is a bight portion 26 having integrally formed therewith a front plate 27. A portion of the upper margin of the front plate 27 is deflected inwardly to form a pocket 28 which forms side shoulders or stops at 29 against which the upper edge of the license plate slot 10 is adapted to engage when the holder or clip is in position with a front lug or finger 30 projecting through a license plate slot 10 to extend against the back surface of the license plate as clearly illustrated in Figures 5 and 6. The lug or finger piece 30 is integrally formed on the upper margin of the pocket 28.

In the modified form of the license plate holders or clips shown in Figures 5 and 6 the back plate 23 of the clip is engaged over the license plate supporting arm 20 and the lug or finger piece 25 is then bent around the lower edge of the bracket arm 20 as shown in Figure 6. The lower margin of the license plate is now engaged in the clips between the intermediate plate 22 and the front plate 27 with the front lug or finger 30 projecting through the license plate slot 10 to be positioned between the back of the license plate and the intermediate plate 22 with the upper edge of the slot 10 positioned above the shoulders 29 formed by the pocket 28 of the front plate 27 of the clip. With the lower margin of the license plate engaged in the supporting clips the front plates 27 of the clips are clamped tightly against the intermediate plates 22 by means of a pair of pliers or the like so that the license plate is tightly clamped in position.

It will of course be understood that various details of construction may be varied through a wide range without departing from the principles of this invention, and it is therefore not the purpose to limit the patent granted hereon otherwise than necessitated by the scope of the appended claims.

I claim as my invention:

1. A license plate supporting member engageable between a slotted license plate supporting bracket and a slotted license plate, said supporting member comprising an S-shaped body portion having a portion thereof deflected to form a pocket section to project into the slot of the license plate when the S-shaped body portion is engaged on the bracket, and an extension lug integrally formed on the deflected pocket section for engagement against the back of the license plate to assist in holding the license plate supported on the bracket.

2. The combination with a slotted license plate and a slotted supporting bracket including a slidable clamping hook, of clip members engaged through the slotted bracket and receiving the lower margin of the license plate seated therein with said clamping hook engaged over the upper margin of the license plate to hold the license plate clamped in place between the clip members and said clamping hook, said clip members having deflected portions projecting through the slots in the license plate and engaging against the back of said license plate.

3. The combination with a clip and two plates one supported on the other by means of the clip, said clip comprising a back plate, a front plate, an intermediate plate integrally connected to the back plate and the front plate, said front plate having a depressed pocket formed therein, and an extension piece formed on said pocket.

STANLEY L. HOGLE.